Feb. 2, 1932.  H. H. MEIER ET AL  1,843,578
METHOD FOR FORMATION AND RECOVERY OF DOCTOR SOLUTION
Filed Jan. 11, 1928
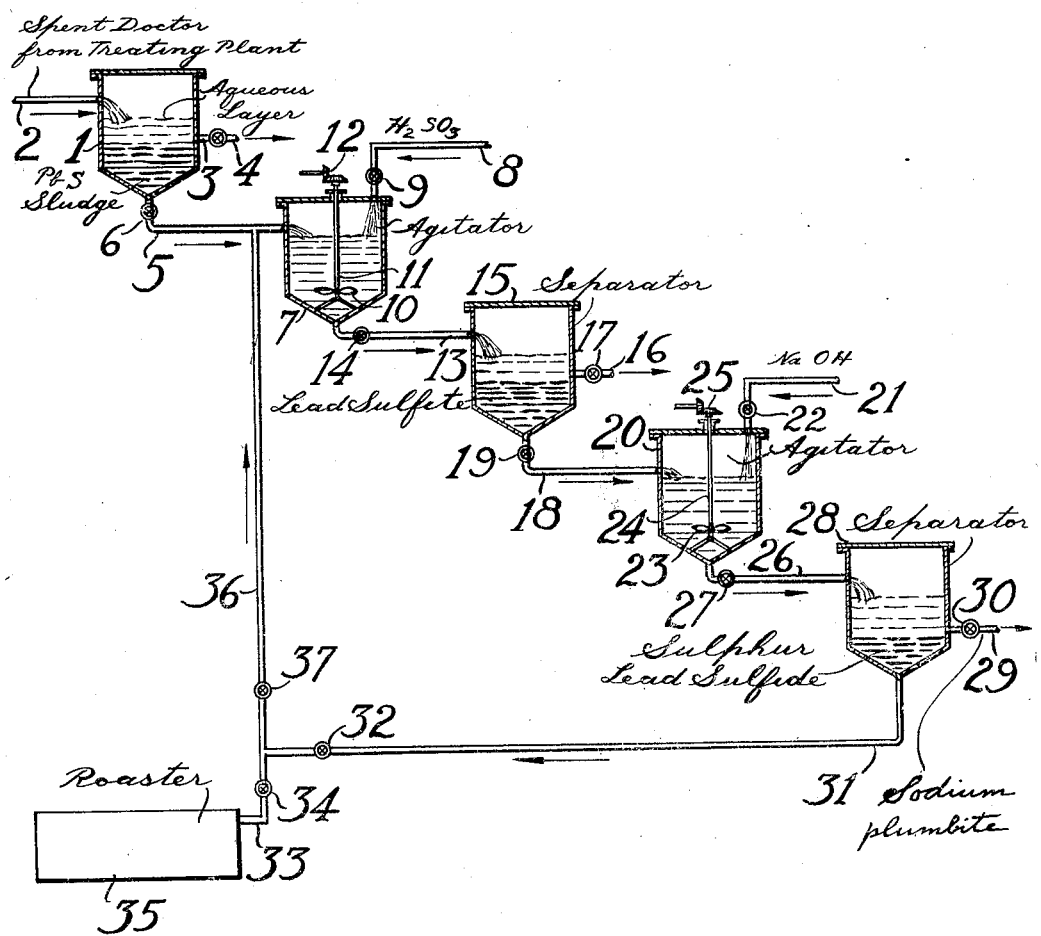
Herbert H. Meier, Inventors
Oliver H. Dawson
By
W. E. Currie, Attorney Patented Feb. 2, 1932

1,843,578

UNITED STATES PATENT OFFICE

HERBERT H. MEIER AND OLIVER H. DAWSON, OF BAYTOWN, TEXAS, ASSIGNORS TO STANDARD OIL DEVELOPMENT COMPANY, A CORPORATION OF DELAWARE

METHOD FOR FORMATION AND RECOVERY OF DOCTOR SOLUTION

Application filed January 11, 1928. Serial No. 246,085.

The present invention relates to the recovery of alkali plumbite and more specifically comprises a method for the regeneration of doctor solutions used to purify hydrocarbon oils. Our invention will be fully understood from the following description.

Hydrocarbon oils such as gasoline, kerosene and the like are frequently contaminated with certain sulphur compounds, the presence of which is detected by the doctor test. This test is well known in the petroleum industry and has been described in Technical Paper No. 323 of the U. S. Bureau of Mines, page 83. It is frequently desirable to remove or modify these sulphur compounds occurring in oils, and a common method is by sweetening or treating with doctor solution which is a solution of litharge in aqueous caustic soda, often termed sodium plumbite.

Sweetening is accomplished by thoroughly mixing the sour oil with a requisite quantity of doctor solution and in this treatment, lead sulphide is precipitated. It is sometimes necessary to add sulphur in small quantities to break out the doctor and the bulk of the lead sulphide settles into the water layer which may be withdrawn. The oil may undergo other treatment but this forms no part of the present invention.

One advantageous way of carrying out the invention will be described in connection with the accompanying drawing, which is a side elevation, with parts broken away of a preferred form of the apparatus.

In the drawing, reference numeral 1 designates a container or settling tank, which is adapted to receive spent doctor solution by means of pipe 2. Upon standing this settles into two layers. The upper layer is a clear aqueous liquid and is withdrawn to storage through pipe 3 provided with valve 4. The lower layer of lead sulphide sludge is passed through pipe 5 provided with valve 6 to agitator 7.

An inlet pipe 8 provided with valve 9 is used to pass a water solution of sulphur dioxide (sulphurous acid) into the agitator 7. A suitable stirring device such as a paddle 10, fixed on rod 11, and rotated through gears 12 by mechanical means such as an electric motor (not shown) is provided to mix the lead sulphide sludge with the water solution of sulphur dioxide. The mixed solution is passed by pipe 13 provided with valve 14, from agitator 7 to separator 15. The solution in separator 15 is allowed to stand, settle and separate into two layers. The upper layer of clear liquid is withdrawn by means of pipe 16 provided with valve 17 and may be discarded or recharged with sulphur dioxide and used with fresh sludge. The lower layer of lead sulphite which is formed by the action of the water solution of sulphur dioxide on the lead sulphide is passed by pipe 18 provided with valve 19 to agitator 20.

An inlet pipe 21 provided with valve 22 is used to pass a water solution of sodium hydroxide into the agitator 20. A suitable stirring device such as a paddle 23, fixed on rod 24, and rotated through gears 25 by mechanical means such as electric motor (not shown) is provided to mix the lead sulphite with the water solution of sodium hydroxide. The mixed solution is passed by pipe 26 provided with valve 27, to separator 28.

The solution in separator 28 is allowed to stand, settle and separate into two layers. The upper layer of clear solution is sodium plumbite solution formed by the reaction of the water solution of sodium hydroxide with lead sulphite, and is passed to storage through pipe 29 provided with valve 30. The lower layer composed of sulphur and lead sulphide which had not reacted with the water solution of sulphur dioxide is passed from separator 28 by pipe 31 provided with valve 32. This sulphur and lead sulphide may be passed to roaster 35 from pipe 31 through pipe 33 controlled by valve 34, where it is dried and roasted in contact with air to furnish sulphur dioxide. By closing valve 34 and opening valve 37 on line 36 the sulphur and lead sulphide may be passed from pipe 31 to pipe 5 where it passes into the agitator 7 to be subjected to a second treatment.

Spent doctor solution, which comprises the aqueous layer, is allowed to stand until the lead sulphide has settled and the liquid is withdrawn, leaving the settled sludge. A solution of sulphur dioxide in water is then thoroughly mixed with the precipitate, preferably agitating until the color of the precipitate changes from black to white. If the reaction is incomplete, the color is gray, due to the presence of black lead sulphide. The sludge comprising the white or gray precipitate is then allowed to settle again and the liquid may be withdrawn and discarded or recharged with $SO_2$ and used with fresh sludge.

Aqueous caustic soda is then added to the white precipitate, a part of which dissolves, leaving sulphur and a small quantity of lead sulphide which may not have been converted in the previous treatment with $SO_2$. The aqueous caustic soda solution is withdrawn and is equivalent to freshly prepared doctor solution in respect to its action on sour oils.

The sludge insoluble in caustic soda comprising sulphur and lead sulphide, may be dried and roasted directly in contact with air to furnish sulphur dioxide for use in the process, but we prefer to subject the sludge to a second treatment with aqueous sulphurous acid and caustic soda exactly as outlined above. By such treatment the recovery of lead may be increased and the resulting insoluble sludge will be substantially sulphur, which may be burned to regenerate sulphur dioxide as will be understood.

As an illustrative example of our process 325 gr. of PbS is agitated with 10 litres of water in which about 310 gr. of $SO_2$ is dissolved. The mixture is agitated for 85 minutes and then allowed to settle. The liquid is removed and the precipitate again agitated with about 1350 cc. of 18° Bé. caustic soda. The solution is then filtered and the filtrate is found to satisfactorily sweeten sour distillates. About 72% of the lead sulphide is converted into sodium plumbite. Greater recovery may be obtained by more thorough agitation with the aqueous solution of sulphur dioxide or by treating the sludge left after agitation with caustic soda, by further treatment with $SO_2$ as indicated above.

In the above description we have described the process as we prefer to operate it but details may vary within the scope of the claims. For example, precipitates need not be settled but may be separated by any method familiar to the art such as filtration or centrifugal separation. Our process is not to be limited by any theory of the mechanism nor by any illustrative example, but only by the following claims in which we wish to claim all novelty inherent in the process.

We claim:

1. A method of preparing sodium plumbite solution comprising the steps of treating lead sulphide with an aqueous solution of sulphur dioxide and then treating the resulting product with an aqueous solution of caustic soda.

2. A process for preparing doctor solutions comprising the steps of treating lead sulphide with an aqueous solution of sulphur dioxide, separating the liquid from the solid, treating the remaining solid with an aqueous solution of caustic soda and separating the doctor solution so formed from the remaining solid.

3. A process for regenerating sodium plumbite from spent doctor solutions used in treating sour oils, comprising the steps of separating lead sulphide from the aqueous spent doctor solution, agitating the lead sulphide with sulphur dioxide dissolved in water until the solid mass appears to become white or gray, separating the liquid from the white solid, agitating the solid with an aqueous solution of caustic soda and separating the solution so formed from the insoluble sludge.

4. A process according to claim 3 in which the sludge undissolved by caustic soda is again agitated with aqueous sulphur dioxide and caustic soda as described.

HERBERT H. MEIER.
OLIVER H. DAWSON.